US005629400A

United States Patent [19]
Standke et al.

[11] Patent Number: 5,629,400
[45] Date of Patent: May 13, 1997

[54] WATER-BASED ORGANOPOLYSILOXANE-CONTAINING COMPOSITIONS, PROCESSES FOR THEIR PREPARATION AND THEIR USE

[75] Inventors: Burkhard Standke, Lörrach; Albert Frings, Rheinfelden; Michael Horn, Rheinfelden; Hans-Joachim Kötzsch, Rheinfelden; Frank Kropfgans, Rheinfelden; Jaroslaw Monkiewicz, Rheinfelden; Claus-Dietrich Seiler, Rheinfelden, all of Germany; Jim Steinmetz, Princeton, N.J.

[73] Assignee: Huels Aktiengesellschaft, Marl, Germany

[21] Appl. No.: 568,384

[22] Filed: Dec. 6, 1995

[30] Foreign Application Priority Data

Dec. 9, 1994 [DE] Germany ............ 44 43 824.9

[51] Int. Cl.⁶ ..................... C08G 77/26
[52] U.S. Cl. ............ 528/38; 524/588; 524/385; 524/388
[58] Field of Search ............ 528/38; 524/588, 524/379, 385

[56] References Cited

U.S. PATENT DOCUMENTS

| 3,203,969 | 8/1965 | Pines et al. .................. 528/38 |
| 4,620,878 | 11/1986 | Gee . |
| 5,073,195 | 12/1991 | Cuthbert et al. . |
| 5,391,680 | 2/1995 | Maruyama ..................... 528/38 |

FOREIGN PATENT DOCUMENTS

| 0358652 | 3/1990 | European Pat. Off. . |
| 0442098 | 8/1991 | European Pat. Off. . |
| 0675128 | 10/1995 | European Pat. Off. . |

OTHER PUBLICATIONS

Kirk–Othmer, Encyclopedia of Chemical Technology, vol. 21, pp. 377, 378, 380, 382, 384 and 386 (1983).
Noller, Chemistry or Organic Compounds, pp. 818–820 (1965), WB Saunders Co, Philadelphia.

Primary Examiner—Melvyn I. Marquis
Attorney, Agent, or Firm—Oblon, Spivak, McClelland, Maier & Neustadt, P.C.

[57] ABSTRACT

The invention relates to water-based organopolysiloxane containing compositions which are essentially free from organic solvents, have a flash point above 70° C. and essentially liberate no alcohols by hydrolysis on dilution with water. The organopolysiloxane-containing compositions according to the invention are obtainable by mixing M mol of water-insoluble organotrialkoxysilanes with Q mol of water-soluble aminoalkylalkoxysilanes in a molar ratio of $0<M/Q\leq 2$, adding water to the mixture, adjusting the pH of the reaction mixture to a value of between 1 and 8 and removing alcohol already present and/or formed during the reaction. The process for the preparation of the organopolysiloxane-containing compositions according to the invention and their use are also disclosed.

17 Claims, No Drawings

WATER-BASED ORGANOPOLYSILOXANE-CONTAINING COMPOSITIONS, PROCESSES FOR THEIR PREPARATION AND THEIR USE

BACKGROUND OF THE INVENTION

1. Field of the Invention

The invention relates to water-based organopolysiloxane containing compositions, a process for their preparation and their use. The organopolysiloxane-containing compositions according to the invention are essentially free from solvents.

2. Discussion of the Background

Organosilanes of the general formula $R^0\text{-Si}(OR^1)_3$, where $R^0$ is an organic radical and $R^1$ is a methyl or ethyl radical, have diverse uses, for example as adhesion promoters, release agents, rheology-improving agents, crosslinking agents and hydrophobicizing agents.

For ecological, work safety and economic reasons, changes are being made to using them in aqueous form. The following problems, in general arise here:
Alcohols are liberated by hydrolysis:

Free alcohols lower the flash point of the solution for use, so that explosion-proof machines and special apparatuses must be employed for the essential processing steps. For toxicological reasons, the employees entrusted with handling the solution must be additionally trained and protected. Furthermore, disposal of the spent solution employed can present difficulties because of the hydrolysis alcohols. Special waste water clarification plants and also plants for after-treatment of waste gas or waste air are required.
The organosilane to be applied in water is not water-soluble:

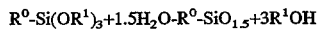

The hydrolysate $R^0\text{-SiO}_{1.5}$ formed according to this equation precipitates out of the reaction mixture as a polymeric silicone resin, so that it is no longer available for the desired use. Organosilanes having a very highly hydrophobic character, such as, for example, alkylalkoxysilanes, especially with a long or branched carbon skeleton, indeed hydrolyse only very slowly, but are not soluble in water.

To reduce the known disadvantages described above, the most diverse processes have been suggested in the past:

Some organosilanes, such as, for example, aminoalkylalkoxysilanes, are indeed water-soluble, but have only a limited usefulness in the various possible uses of organofunctional silanes. The introduction of further functional units, in particular on the basis of organosilanes which are water-insoluble per se, such as, for example, alkylalkoxysilanes, for example isobutyltrimethoxysilane, is desirable here. The measure of removal of hydrolysis alcohols by distillation during synthesis for preparation of organosilane formulations from only water-soluble organosilanes, such as, for example, from 3-aminopropyltriethoxysilane, is known. Water-based aminosilane systems which have a low alcohol content and are otherwise free from solvents are accessible in this manner and are available on the market, for example, in the form of DYNASYLAN® 1151.

The modification of water-based organosilane formulations of this type, with small amounts of organosilanes which are water-insoluble per se, such as, for example, methyltrimethoxysilane or vinyltrimethoxysilane, is described in unpublished European patent application entitled "Method for preparation of stable waterborne silane compositions". A molar ratio of the water-insoluble component to the water-soluble component of 1:2.5 can be achieved by this process. At a higher content of water-insoluble silanes, highly viscous products which gel in the course of time are formed. The use properties essentially correspond to those of the above-mentioned water-based organosilane formulations. Aqueous solutions which are stable for months and have relatively high contents of water-insoluble organosilanes, for example methyltrimethoxysilane or vinyltrimethoxysilane, are not accessible by this process. The preparation of aqueous solutions of highly hydrophobic silanes, such as, for example, isobutyltrimethoxysilane, is impossible in this manner.

In the emulsion method, which also belongs to the prior art, the organosilane which is water-incompatible per se is emulsified in water on liquid, water-insoluble silicone resin with the aid of emulsifiers (EP-A2 0 442 098, EP-B10 358 652 and U.S. Pat. No. 4,620,878). It is a disadvantage here that the products comprise considerable contents of surfactants as emulsifiers and can liberate considerable amounts of alcohol.

Formulation of silane combinations in water is disclosed in U.S. Pat. No. 5,073,195. The silane formulations are prepared from a water-insoluble alkyltrialkoxysilane and a water-soluble silane, such as, for example, an aminoalkylalkoxysilane, in a molar ratio of between 1:2 and 3:1. As can be seen from the examples of the U.S. patent specification, the formulations are prepared by hydrolysis of the silane mixture in less than the stoichiometric amount and by stripping of the reaction mixture at 60° C. under reduced pressure, and for subsequent uses, the silane formulations thus obtained are also diluted with water. However, by dilution with water, the alkoxy groups which remain from the incomplete hydrolysis are split off in the form of the corresponding alcohol. The silane cohydrolysates disclosed in this reference comprise free alcohols in significant amounts and can furthermore liberate further amounts of alcohol by hydrolysis, which has an adverse influence on the use properties of the products.

The present invention is therefore based on the object of developing essentially solvent-free, water-based organosilane formulations which have the lowest possible content of free alcohols, have the highest possible flash point and liberate essentially no alcohols by hydrolysis on dilution with water.

SUMMARY OF THE INVENTION

It has now been found, surprisingly, that essentially solvent-free water-based organopolysiloxane-containing compositions with very good use properties are obtainable if water-insoluble organosilanes of the general formula II are mixed with water-soluble organosilanes of the general formula I in a molar ratio M, i.e. based on the water-insoluble organotrialkoxysilanes, to Q, i.e. based on the water-soluble aminoalkylalkoxysilanes, of $0<M/Q\leq 2$, water is added to the mixture, the pH of the reaction mixture is brought to a value of between 1 and 8 and alcohol already present or formed during the reaction is removed by distillation. Preferably, water is added during the removal of the alcohol by distillation at the rate at which the alcohol or alcohol/water mixture is removed from the reaction medium. Monobasic acids are particularly suitable for adjusting the pH. Products prepared in this way do not liberate further alcohols by hydrolysis, even on dilution with water, and have a flash point of significantly above 70° C.

The present invention therefore relates to water-based organopolysiloxane-containing compositions which are essentially free from organic solvents, have a flash point above 70° C. and essentially liberate no alcohols by hydrolysis on dilution with water.

DETAILED DESCRIPTION OF THE PREFERRED EMBODIMENTS

According to current model concepts of monomeric, oligomeric, polymeric and copolymeric condensation products, these can also be formed in an aqueous system as the result of a hydrolysis reaction of water-insoluble and water-soluble organosilanes.

The organopolysiloxane-containing compositions according to the invention can thus comprise, for example, linear cocondensates of the general formula

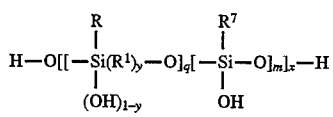

and/or cyclic cocondensates of the general formula

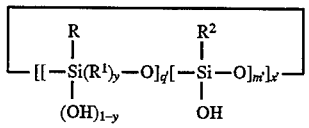

and/or linear condensates of the general formula

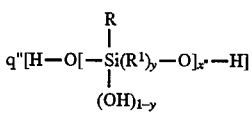

and/or linear condensates of the general formula

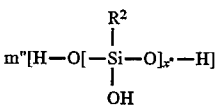

and/or cyclic condensates of the general formula

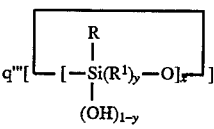

and/or cyclic condensates of the general formula

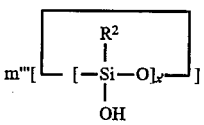

and/or silanols of the general formula

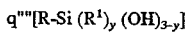

and/or silanols of the general formula

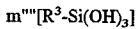

wherein R can be, for example, an amino-functional organic group of the general formula

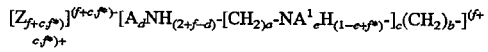

in which $1 \leq a \leq 6$, $1 \leq b \leq 6$, $0 \leq c \leq 6$, $0 \leq d \leq 2$, $0 \leq e \leq 1$, $0 \leq f \leq 1$, $0 \leq f^* \leq 1$, and A and $A^1$ are each independently a benzyl or vinylbenzyl radical, N is a nitrogen atom and Z is a monovalent inorganic or organic acid radical, such as, for example, $Cl^-$, $NO_3^-$, $HCOO^-$ or $CH_3COO^-$, in which $R^1$ is, for example, a methyl or ethyl radical; and $R^2$ is, for example, a linear, cyclic or branched $C_{1-6}$ alkyl radical or a ureido-alkyl group of the general formula

where $1 \leq b \leq 6$ and $0 \leq y \leq 1$, x, x', x", x''' and x'''' are values between 1 and 20 in the distribution of the polymers; and the ratio M/Q is, for example, between 0 and 2, in which Q is the sum of q+q'+q"+q'''+q'''' and M is the sum of m+m'+m"+m'''+m''''.

The invention furthermore related to organopolysiloxane containing compositions as described above which are obtained by mixing Q mol of water-soluble aminoalkylalkoxysilanes of the general formula I $$R\text{-}Si(R^1)_y(OR^{1*})_{3-y} \qquad (I)$$

with M mol of water-insoluble alkylalkoxysilanes of the general formula II $$R^2\text{-}Si(OR^{1**})_3 \qquad (II)$$

wherein R is an amino-functional organic group of the general formula III

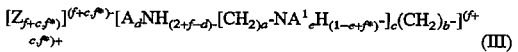

wherein $1 \leq a \leq 6$, $1 \leq b \leq 6$, $0 \leq c \leq 6$, $0 \leq d \leq 2$, $0 \leq e \leq 1$, $0 \leq f \leq 1$, $0 \leq f^* \leq 1$, and A and $A^1$ are each independently a benzyl or vinylbenzyl radical, N symbolizes a nitrogen atom and Z is a monovalent inorganic or organic acid radical, such as, for example, $Cl^-$, $NO_3^-$, $HCOO^-$ or $CH_3COO^-$, $R^1$, $R^{1*}$ and $R^{1**}$ are each independently a methyl or ethyl radical and $R^3$ is a linear, cyclic or branched $C_{1-6}$ alkyl radical or a ureido-alkyl group of the general formula IV $$NH_2\text{-}CO\text{-}NH\text{-}(CH_2)_b\text{-} \qquad (IV)$$

where $1 \leq b \leq 6$ and $0 \leq y \leq 1$, in the molar ratio of $0 < M/Q \leq 2$, adding water to the mixture, adjusting the pH of the reaction mixture to a value of between 1 and 8 and removing the alcohol already present and/or formed during the reaction.

The present invention furthermore relates to a process for the preparation of organopolysiloxane-containing compositions as described above which is characterized in that Q mol of water-soluble aminoalkylalkoxysilanes of the general formula I $$R\text{-}Si(R^1)_y(OR^{1*})_{3-y} \qquad (I)$$

are mixed with M mol of water-insoluble alkylalkoxysilanes of the general formula II $$R^2\text{-Si}(OR^{1**})_3, \quad (II)$$

wherein R is an amino-functional organic group of general formula III

wherein $1 \leq a \leq 6$, $1 \leq b \leq 6$, $0 \leq c \leq 6$, $0 \leq d \leq 2$, $0 \leq e \leq 1$, $0 \leq f \leq 1$, $0 \leq f^* \leq 1$, and A and $A^1$ are each independently a benzyl or vinylbenzyl radical, N symbolizes a nitrogen atom and Z is a monovalent inorganic or organic acid radical, such as, for example, $Cl^-$, $NO_3^-$, $HCOO^-$ or $CH_3COO^-$, $R^1$, $R^{1*}$ and $R^{1**}$ are each independently a methyl or ethyl radical and $R^2$ is a linear, cyclic or branched $C_{1-6}$ alkyl radical or a ureido-alkyl group of the general formula IV $$NH_2\text{-CO-NH-}(CH_2)_b\text{-} \quad (IV)$$

where $1 \leq b \leq 6$ and $0 \leq y \leq 1$, in the molar ratio of $0 < M/Q \leq 2$, water is added to the mixture, the pH of the reaction mixture is brought to a value of between 1 and 8 and the alcohol already present and/or formed during the reaction is removed.

The present invention furthermore relates to the preferred compositions using the water-based organopolysiloxane-containing compositions as described above for hydrophobicizing surfaces, for hydrophobicizing mineral building materials, for protection of buildings and facades, for coating glass fibers, for silanizing fillers, as adhesion promoters, in particular for improving the adhesion of organic polymers to inorganic surfaces, as release agents, for improving the rheological properties, in particular of polymer dispersions and emulsions, for hydrophobicizing textiles, leather and cellulose and starch products, as crosslinking agents and as an additive to paints and varnishes.

Solvent-free compositions here are to be understood as meaning those which comprise no aliphatic or aromatic hydrocarbons, halogenated hydrocarbons, glycols, glycol ethers, ethers, ketones, esters, amides or other nitrogen compounds or sulphur or nitro compounds on a purely organic basis and proton-free (or hydrogen-free) solvents in contents of more than 10 ppm by weight. In contrast, proton-containing agents such as water, inorganic or organic acids and alcohols, such as methanol, ethanol, n- and i-propanol and higher alcohols in this series, are not regarded as organic solvents below.

The organopolysiloxane-containing compositions according to the invention are essentially free from organic solvents, but can comprise small amounts of alcohols, in particular methanol and/or ethanol. The alcohol content in the organosiloxane-containing compositions according to the invention is preferably less than 5% by weight, particularly preferably less than 1.5% by weight, and especially preferably less than 0.5% by weight.

The organopolysiloxane-containing compositions according to the invention preferably have a pH of between 1 and 8, particularly preferably a pH of between 3 and 6 and especially preferably a pH of between 3 and 5. These suitably comprise a monobasic inorganic and/or organic acid and/or secondary products thereof. Secondary products here are understood as meaning compounds such as alkali metal halides, in particular sodium chloride or potassium chloride, alkali metal acetates, alkali metal formates, alkali metal nitrates or compounds of the amino groupings in the organopolysiloxanes with inorganic or organic acid radicals, such as are to be seen from the general formula III.

As a result of an advantageous manner in the preparation, the organopolysiloxane-containing compositions according to the invention can comprise a defoamer, preferably a silicone resin suspension.

The process for the preparation of the organosiloxane-containing compositions according to the invention can be carried out as described in detail below:

water-soluble organosilanes of the general formula I are first mixed with water-insoluble organosilanes of the general formula II. Water can then be added to the reaction mixture, preferably 0.5 to 30 mol of water, particularly preferably 1 to 5 mol of water per total moles of aminoalkylalkoxysilanes of the general formula I and of organosilanes of the general formula II. The water is preferably added discontinuously in portions. However, the metering in of the water can also be carried out continuously, or the discontinuous and continuous procedure of metering in of water, can be combined with one another in a suitable manner. A procedure can also be followed in which one of the above-mentioned organosilane components is initially introduced into the reaction vessel, the water is metered in, the other organosilane component is subsequently added and—if still necessary—water is then subsequently metered in.

The pH of the reaction mixture is suitably brought to a value of between 1 and 8, preferably to a value of between 3 and 6, particularly preferably to a value of between 3 and 5. The acid can be metered in together along with the metering in of the water or else separately. An inorganic or organic acid, preferably a monobasic acid, particularly preferably nitric acid or hydrochloric acid or acetic acid or formic acid, is in general added to the reaction mixture.

The reaction is, in general, carried out in a temperature range between 0° and 100° C., preferably in a temperature range between 10° and 80° C. and particularly preferably between 20° and 60° C. The reaction is preferably carried out with stirring.

The alcohol already present and/or formed during the reaction is, in general, removed from the reaction mixture. Preferably, the alcohol already present and/or formed during the reaction is removed by distillation, and during this procedure water is simultaneously added at the rate at which alcohol is removed from the reaction mixture. The removal of the alcohol by distillation is preferably carried out under reduced pressure. The removal of the alcohol by distillation is preferably carried out until a temperature which corresponds to the boiling point of water is reached in the top of the column.

The pH in the reaction medium can also be adjusted by addition of an organic or inorganic acid, in particular a monobasic acid, during and/or after the removal of the alcohols by distillation.

In the process according to the invention, the residual content of alcohol in the organopolysiloxane-containing compositions is preferably adjusted to less than 5% by weight, particularly preferably to less than 1.5% by weight, and especially preferably to less than 0.5% by weight.

To reduce foaming, a defoamer, particularly preferably an aqueous silicone resin suspension, is preferably added before and/or during the removal of the alcohol by distillation.

Cloudiness or precipitation sometimes occurs in the product during or after the end of the distillation, which often originates from the defoamer added. To obtain a clear product, the resulting product may be suitably after-purified, by sedimentation and/or filtration after removal of the alcohol by distillation. The filtration and the removal of the sediment can be carried out, for example, via a pressure suction filter, a separator, a decanter or similar apparatus.

Products prepared by the process according to the invention are stable and clear solutions. The organopolysiloxane-containing compositions according to the invention can be diluted with water in all proportions, essentially develop no hydrolysis alcohols on addition of water, have a flash point above 70° C., preferably above 95° C., particularly preferably above 98° C., and are essentially free from organic solvents and surfactants as emulsifiers.

The products according to the invention or prepared according to the invention are used with significant advantages over products of the relevant prior art, in particular for hydrophobicizing surfaces, for example for the impregnation of leather and textiles of naturally occurring and/or synthetic materials and in the field of organic and mineral building materials and building protection.

Having generally described this invention, a further understanding can be obtained by reference to certain specific examples which are provided herein for purposes of illustration only and are not intended to be limiting unless otherwise specified.

EXAMPLES

Reaction apparatus for all the following examples, including the comparison example:

Laboratory stirred kettle reactor of 2 l capacity, temperature-controllable, internal temperature measurement, liquid-metering device, distillation bridge with overhead temperature measurement, product condenser, distillate receiver; laboratory pressure suction filter (2 l capacity).

The following process parameters apply to all the following examples, including the comparison example:

Foaming problems during the distillation can be prevented by adding a few drops of a commercially available defoamer based on aqueous silicone resin emulsions to the reaction solution. The slight clouding resulting from the addition of defoamer can be removed by filtration over a pressure suction filter with a glass fibre filter (pore width<1 µm).

The Products obtained in Examples 1 to 8 According to the invention have the following Properties in common:

The product is clear and is miscible in water in all proportions. The content of alcohols is less than 0.5% by weight. The flash point of the products is >95° C. and also does not fall on further dilution with water, since no further hydrolysis takes place and therefore no further alcohols are liberated.

Example 1

Preparation of a water-soluble cohydrolysate of aminopropyltriethoxysilane (AMEO) and methyltriethoxysilane (MTRS) in a molar ratio of 1:1.

221 g of AMEO and 178 g of MTES are mixed in the apparatus described above, and 54 g of water are added. After half an hour, a further 126 g of water are added via the metering device in the course of 15 minutes, while stirring. During this procedure, the temperature rises from 20° C. to about 50° C. 114 g of HCl (32% strength by weight in water) are metered in via the metering device in the course of a further 15 minutes, while stirring. An ethanol/water mixture is distilled off in the course of about 4 hours at a bottom temperature of about 60° C. under a pressure of about 135 mbar until the overhead temperature is about 50° C. and the top product comprises only water. During the distillation, water is added to the product via the metering device at a rate corresponding in amount to the amount of distillate removed.

Example 2

As Example 1, with the difference that 60 g of acetic acid instead of aqueous HCl are used to adjust the pH.

Example 3

Preparation of a water-soluble cohydrolysate of AMEO and propyltrimethoxysilane (PTMO) in a molar ratio of 1:1.

221 g of AMEO and 164 g of PTMO are mixed in the apparatus described above, and 54 g of water are added. After half an hour, a further 126 g of water are added via the metering device in the course of 15 minutes, while stirring. During this operation, the temperature rises from 20° C. to about 57° C. 114 g of HCl (32% strength by weight in water) are added via the metering device in the course of a further 15 minutes, while stirring. An ethanol/methanol/water mixture is distilled off at a bottom temperature of up to 102° C. under normal pressure in the course of about 4 hours, until the overhead temperature is about 100° C. and the top product comprises only water. During the distillation, water is added to the product via the metering device at a rate which corresponds in amount to the amount of distillate removed.

Example 4

Preparation of a water-soluble cohydrolysate of AMEO and vinyltrimethoxysilane (VTMO) in a molar ratio of 1:1.

221 g of AMEO and 164 g of VTMO are mixed in the apparatus described above, and 54 g of water are added. After half an hour, a further 126 g of water are added via the metering device in the course of 15 minutes, while stirring. During this operation, the temperature rises from 20° C. to about 57° C. 114 g of HCl (32% strength by weight in water) are metered in via the metering device in the course of a further 15 minutes, while stirring. An ethanol/methanol/water mixture is distilled off at a bottom temperature of up to 102° C. under normal pressure in the course of about 4 hours, until the overhead temperature is about 100° C. and the top product comprises only water. During the distillation, water is added to the product via the metering device at a rate which corresponds in amount to the amount of distillate removed, Example 5

Preparation of a water-soluble cohydrolysate of AMEO and isobutyltrimethoxysilane (IBTMO) in a molar ratio of 1:1.

221 g of AMEO and 178 g of IBTMO are mixed in the apparatus described above, and 54 g of water are added. After half an hour, a further 64 g of water are added via the metering device in the course of 15 minutes, while stirring. During this operation, the temperature rises from 20° C. to about 60° C. 110 g of HCl (33% strength by weight in water) are metered in via the metering device in the course of a further 15 minutes, while stirring. An ethanol/methanol/water mixture is distilled off at a bottom temperature of up to 52° C. under a pressure of 130 mbar in the course of about 4 hours, until the overhead temperature is about 50° C. and the top product comprises only water. During the distillation, water is added to the product via the metering device at a rate which corresponds in amount to the amount of distillate removed.

Example 6

Preparation of a water-soluble cohydrolysate of 3-aminopropylmethyldimethoxysilane (methyl-AMEO) and MTES in a molar ratio of 1:1.

191 g of methyl-AMEO and 178 g of MTES are mixed in the apparatus described above, and 54 g of water are added. After half an hour, a mixture of 64 g of water and −110 g of HCl (33% strength by weight in water) is added via the metering device in the course of 30 minutes, while stirring. During this operation, the temperature rises from 20° C. to about 65° C. An ethanol/water mixture is distilled off at a bottom temperature of up to 52° C. under a pressure of 130 mbar in the course of about 4 hours, until the overhead temperature is about 50° C. and the top product contains only water. During the distillation, water is added to the product via the metering device at a rate which corresponds in amount to the amount of distillate removed.

Example 7

Preparation of a water-soluble hydrolyzate from N-benzylaminoethylaminopropyltrimethoxysilane (DYNASYLAN® 1160).

400 g of DYNASYLAN® 1160 (50% strength by weight silane solution in methanol, manufacturer Hüls AG) are initially introduced into the apparatus described above, and 25 g of water are added. Since the silane employed is a 50% strength by weight silane solution in methanol, 100 g of methanol are first removed by distillation (bottom temperature 60° C., pressure falling from 300 mbar to <1 mbar). 49.5 g of acetic acid are then metered into the methanol-free viscous silane at 40° to 45° C. 375 g of water are added via the metering device at a bottom temperature of 50° C. in the course of 15 minutes. 250 g of a methanol/water mixture are distilled off at a maximum bottom temperature of 55° C. and under a pressure falling from 300 to 130 mbar in the course of 3 hours. During the distillation, water is added to the product via the metering device at a rate which corresponds in amount to the amount of distillate removed.

Example 8

Preparation of a water-soluble hydrolyzate from ureidopropyltrimethoxysilane (DYNASYLAN® 2201) and aminopropyltriethoxysilane (AMEO).

400 g of DYNASYLAN® 2201 (50% strength by weight solution of ureidopropyltriethoxysilane in methanol, manufacturer Hüls AG) and 200 g of AMEO are initially introduced into the apparatus described above, and 50 g of water are added. 200 g of a methanol/ethanol mixture are distilled off at a bottom temperature of 60° C. under reduced pressure (300 mbar falling to <1 mbar). 550 g of water are added via the metering device at a bottom temperature rising to 80° C. in the course of 10 minutes. A methanol/ethanol/water mixture is distilled off at the ambient pressure until the overhead temperature is constant at 100° C. During the distillation, water is added to the product via the metering device at a rate which corresponds in amount to the amount of distillate removed.

Comparison Example 1

Preparation of a silane cohydrolysate (in this context cf. Example 1).

221 g of AMEO and 178 g of MTES are mixed in the apparatus described above. 626 g of water are added via the metering device in the course of 30 minutes, while stirring. During this operation, the temperature rises from 20° C. to about 50° C. and the product mixture (pH>10) meanwhile becomes cloudy and two-phase. An ethanol/water mixture is distilled off at a bottom temperature of about 60° C. under a pressure of about 135 mbar in the course of about 4 hours, until the overhead temperature is about 50° C. and the top product contains only water. During the distillation, water is added to the product via the metering device at a rate which corresponds in amount to the amount of distillate removed. The product is highly viscous and has heavy precipitates.

Comparison Example 2

Silane cohydrolysate from aminoethylaminopropyltrimethoxysilane (DYNASYLAN® DAMO) and methyltriethoxysilane (XTES) in a molar ratio of 1:1, prepared by incomplete hydrolysis and dissolving in water (in accordance with U.S. Pat. No. 5,073,195).

222 g of DAMO are mixed with 178 g of MTES in the apparatus described above, and 24 g of water are added. The hydrolysis alcohols (about 100 g of a methanol/ethanol mixture) are then distilled off in vacuo after stirring at about 60° C. for 1 hour. The viscous product which remains is dissolved in 1 676 g of water.

After a storage period of one day, the product comprises about 7% by weight of free alcohols. The flash point of the solution is below 60° C. After a storage period of about 10 days, significant clouding occurs, and becomes more intensive as the storage period increases.

Obviously, numerous modifications and variations of the present invention are possible in light of the above teachings. It is therefore to be understood that within the scope of the appended claims, the invention may be practiced otherwise than as specifically described herein.

This application is based on German Patent Application P. 44 43 824.9, filed with the German Patent Office on Dec. 9, 1994, the entire contents of which are hereby incorporated by reference.

What is claimed as new and desired to be secured by Letters Patent of the United States is:

1. A water-soluble organopolysiloxane-containing composition comprising a water-soluble organopolysiloxane wherein said composition is essentially free from organic solvents selected from aliphatic or aromatic hydrocarbons, halogenated hydrocarbons, glycols, glycol ethers, ethers, ketones, esters, amides or other nitrogen compounds or sulfur or nitro compounds or proton-free solvents, and wherein said composition has a flash point of more than 70° C. and essentially liberates no alcohol by hydrolysis on dilution with water.

2. The organopolysiloxane-containing composition of claim 1, obtained by 1) mixing Q mol of water-soluble aminoalkylalkoxysilane of formula I

with M mol of water-insoluble alkylalkoxysilane of formula II

wherein R is an amino-functional organic group of the general formula III

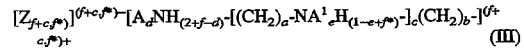

wherein $1 \leq a \leq 6$, $1 \leq b \leq 6$, $0 \leq c \leq 6$, $0 \leq d \leq 2$, $0 \leq e \leq 1$, $0 \leq f \leq 1$, $0 \leq f^* \leq 1$, and A and $A^1$ are each independently a benzyl or vinylbenzyl radical, N symbolizes a nitrogen atom and Z is a monovalent inorganic or organic acid radical, $R^1$, $R^{1*}$ and $R^{1**}$ are each independently a methyl or ethyl radical and $R^2$ is a linear, cyclic or branched $C_{1-6}$ alkyl radical or a ureido-alkyl group of formula IV

where $1 \leq b \leq 6$ and $0 \leq y \leq 1$, in the molar ratio of 0<M/Q≦2 to form a mixture, ii) adding water to said mixture, iii) adjusting the pH of said mixture to a value of between 1 and 8; and iii) removing an alcohol already present and/or formed during a reaction.

3. The organopolysiloxane-containing composition of claim 2, wherein said composition has a pH of between 1 and 8.

4. The organopolysiloxane-containing composition of claim 1, further comprising a member selected from the group consisting of a monobasic inorganic acid, a monobasic organic acid, alkali and amino salts of a monobasic inorganic acid, alkali metal and amino salts of a monobasic organic acid and a mixture thereof.

5. The organopolysiloxane-containing composition of claim 1, wherein an alcohol content of said organopolysiloxane-containing compositions is less than 5% by weight.

6. The organopolysiloxane-containing composition of claim 1, further comprising a silicone resin suspension.

7. A process for the preparation of an organopolysiloxane containing composition comprising i) mixing Q mol of water-soluble aminoalkylalkoxysilanes of formula I

$$R\text{-}Si(R^1)_y(OR^{1*})_{3-y} \quad (I)$$

with M mol of water-insoluble alkylalkoxysilanes of formula II

$$R^2\text{-}Si(OR^{1**})_3, \quad (II)$$

wherein R is an amino-functional organic group of the general formula III

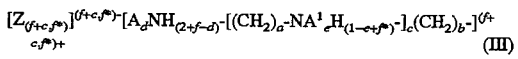

$$[Z_{(f+cf^*)}]^{(f+cf^*)}\text{-}[A_dNH_{(2+f-d)}\text{-}[(CH_2)_a\text{-}NA^1_eH_{(1-e+f^*)}]_c(CH_2)_b\text{-}]^{(f+cf^*)+} \quad (III)$$

wherein 1≦a≦6, 1≦b≦6, 0≦c≦6, 0≦d≦2, 0≦e≦1, 0≦f≦1, 0≦f*≦1, and

A and $A^1$ are each independently a benzyl or vinylbenzyl radical, N symbolizes a nitrogen atom and Z is a monovalent inorganic or organic acid radical, $R^1, R^{1*}$ and $R^{1**}$ are each independently a methyl or ethyl radical; and $R^2$ is a linear, cyclic or branched $C_{1-6}$ alkyl radical or a ureido-alkyl group of formula IV

$$NH_2\text{-}CO\text{-}NH\text{-}(CH_2)_b\text{-} \quad (IV)$$

where 1≦b≦6 and 0≦y≦1, in the molar ratio of 0<M/Q ! 2 to form a mixture, ii) adding water to said mixture, iii) adjusting the pH of said mixture to a value of between 1 and 8; and iv) removing an alcohol already present and/or formed during a reaction.

8. The process of claim 7, wherein 0.5 to 30 mol of water per total moles of the aminoalkylalkoxysilane of formula I employed and of the alkylalkoxysilane of formula II is added to said reaction mixture.

9. The process of claim 7, wherein a monobasic acid is added to said reaction mixture.

10. The process of claim 7, wherein a reaction is carried out in a temperature range between 0° and 100° C.

11. The process according to claim 7, wherein an alcohol already present and/or formed during said reaction is removed by distillation, and while said alcohol is being removed, water is simultaneously added at a rate at which alcohol is removed from said reaction medium.

12. The process of claim 7, wherein removal of said alcohol by distillation is carried out under reduced pressure.

13. The process of claim 7, wherein removal of said alcohol by distillation is continued until a temperature which corresponds to the boiling point of water is reached in the top of a column.

14. The process of claim 7, wherein a defoamer is added to reduce foaming before and/or during the removal of said alcohol by distillation.

15. The process of claim 7, wherein a residual content of alcohol in said organopolysiloxane-containing compositions is adjusted to <5% by weight.

16. The process of claim 7, further comprising after-purifying by sedimentation, filtration or both, after the removal of said alcohol by distillation.

17. The organopolysiloxane-containing composition of claim 1, for hydrophobicizing surfaces, for silanizing fillers, for improving the rheological properties of polymer dispersions and emulsions, for hydrophobicizing textiles, leather and cellulose and starch products, as adhesion promoters, as release agents, as crosslinking agents or as additives for paints and varnishes.

* * * * *